United States Patent
Eager et al.

(10) Patent No.: US 7,119,673 B2
(45) Date of Patent: Oct. 10, 2006

(54) LOADING DOCK MONITORING SYSTEM AND APPARATUS

(75) Inventors: Leslie Eager, Fortworth, TX (US); Thomas Ronald Goolsby, Terrell, TX (US)

(73) Assignee: SPX Corporation, Charlotte, NC (US)

( * ) Notice: Subject to any disclaimer, the term of this patent is extended or adjusted under 35 U.S.C. 154(b) by 143 days.

(21) Appl. No.: 10/849,872

(22) Filed: May 21, 2004

(65) Prior Publication Data

US 2005/0261786 A1   Nov. 24, 2005

(51) Int. Cl.
*G08B 23/00* (2006.01)
(52) U.S. Cl. ............... 340/500; 340/525; 340/539.13; 340/540; 340/825.49; 340/933
(58) Field of Classification Search ............... 340/500, 340/525, 533, 540, 686.1, 679, 687, 933, 340/539.13, 539.26, 825.49, 539.1; 700/17, 700/83
See application file for complete search history.

(56) References Cited

U.S. PATENT DOCUMENTS

| | | | | |
|---|---|---|---|---|
| 4,922,339 A | * | 5/1990 | Stout et al. | 348/143 |
| 5,008,661 A | * | 4/1991 | Raj | 340/10.51 |
| 5,047,748 A | | 9/1991 | Trickle | 340/542 |
| 5,168,267 A | | 12/1992 | Trickle | 340/686 |
| 5,831,540 A | | 11/1998 | Sullivan et al. | 340/679 |
| 5,850,187 A | * | 12/1998 | Carrender et al. | 340/10.6 |
| 6,329,931 B1 | | 12/2001 | Gunton | 340/933 |
| 2004/0012483 A1 | | 1/2004 | Mays | 340/5.71 |
| 2005/0150952 A1 | * | 7/2005 | Chung | |

* cited by examiner

*Primary Examiner*—Hung Nguyen
(74) *Attorney, Agent, or Firm*—Baker & Hostetler LLP (57) ABSTRACT

A system and apparatus for monitoring the status of loading dock equipment includes a control panel operatively connected to an input/output device which is operatively connected to a display device for displaying the status of at least some of the dock loading equipment. A method for monitoring the status of dock loading equipment is also provided. The method includes displaying the status of various dock loading equipment.

20 Claims, 6 Drawing Sheets

LOADING DOCK MONITORING SYSTEM AND APPARATUS

FIELD OF THE INVENTION

The present invention relates generally to a system and apparatus for monitoring equipment. More particularly, the present invention relates to a system and apparatus for monitoring loading dock equipment and recording the status of that equipment.

BACKGROUND OF THE INVENTION

Loading docks located at warehouses and other places where cargo is on and offloaded from freight vehicles have a variety of equipment associated with them. For example, many loading docks have a garage-type door that provides security and protection to the interior of the warehouse from the elements. Loading docks may also be equipped with other equipment such as lights and a dock leveler.

A dock leveler is used to form a bridge between the surface of the loading dock and the bed of a freight vehicle. Often, freight vehicles such as tractor trailers have a bed located at a different height than the dock. Many dock levelers include a ramp that is hinged at one end that can be raised or lowered to match the level of the bed of the freight vehicle. At the free end of the ramp is a lip that pivots between a pendant position about perpendicular with the ramp and an extended position where the lip is substantially coplanar with the ramp. Often the lip is extended and then brought down by a means of lowering the ramp to allow the lip to rest on the bed of the freight vehicle, thus establishing a bridge between the loading dock and the bed of the freight vehicle.

Other common pieces of equipment associated with loading docks may include a vehicle restraint. A vehicle restraint may attach to either the frame of the vehicle itself, or it may involve a blocking device, such as a wheel chock, to hold the freight vehicle in place. These several pieces of equipment associated with the loading dock are often controlled by control panels that may be located within the warehouses themselves. The control panels may be unitary, in other words, may control all of the pieces of equipment, or be singularly dedicated to an individual piece of equipment. In other instances, a control panel may control a few pieces of equipment but not all of the equipment associated with the loading dock.

Larger loading docks may include several bays where each bay may be equipped with a door, a dock leveler, vehicle restraint, lights or other pieces of equipment. For a variety of reasons, it may be desirable to monitor the status of a piece of equipment at a loading dock. For example, it may be desirable to monitor whether a dock door is open or in a closed position, in what position a dock leveler is in, or whether or not a vehicle restraint is engaged with a vehicle.

In some instances, it may be desirable to keep records of the status of various pieces of equipment associated with the loading dock and establish the time in which the pieces of equipment were manipulated during normal loading dock operations. Accordingly, it is desirable to provide a method and apparatus that monitors the status of various pieces of loading dock equipment and, in some instances, keeps or maintains a historical record of the status of loading dock equipment.

SUMMARY OF THE INVENTION

The foregoing needs are met, to a great extent, by the present invention, wherein in one aspect an apparatus is provided that in some embodiments includes a method and apparatus that monitors the status of various pieces of loading dock equipment, and, in some instances, maintains a historical record of the status of various pieces of loading dock equipment.

In accordance with one embodiment of the present invention, a loading dock equipment monitoring system is provided. The system includes: a loading dock equipment control panel; a first input output device operatively connected to the control panel and configured to be inputted with loading dock equipment status information; and a second input output device located remotely from the control panel and first input output device, the second input output device display operatively connected to the first input output device via a network and configured to communicate to a system user at least some of the loading dock equipment status information.

In accordance with another embodiment of the present invention, a loading dock equipment monitoring system is provided. The system includes: means for controlling loading dock equipment; means for inputting and outputting loading dock equipment status information operatively connected to the controlling means; and means for accessing at least some of the loading dock equipment status information via a network.

In accordance with another embodiment of the present invention, a method of monitoring loading dock equipment status is provided. The method includes: operable connecting a loading dock equipment control panel to a first input output device; configuring the control panel to input loading dock status information into the first input output device; operable connecting a second input output device via a network to the first input output device; and configuring the second input output device to communicate the loading dock equipment status information to a system user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a loading dock equipment monitoring system.

Another embodiment of the present invention provides a method for monitoring loading dock equipment.

Figure 1:
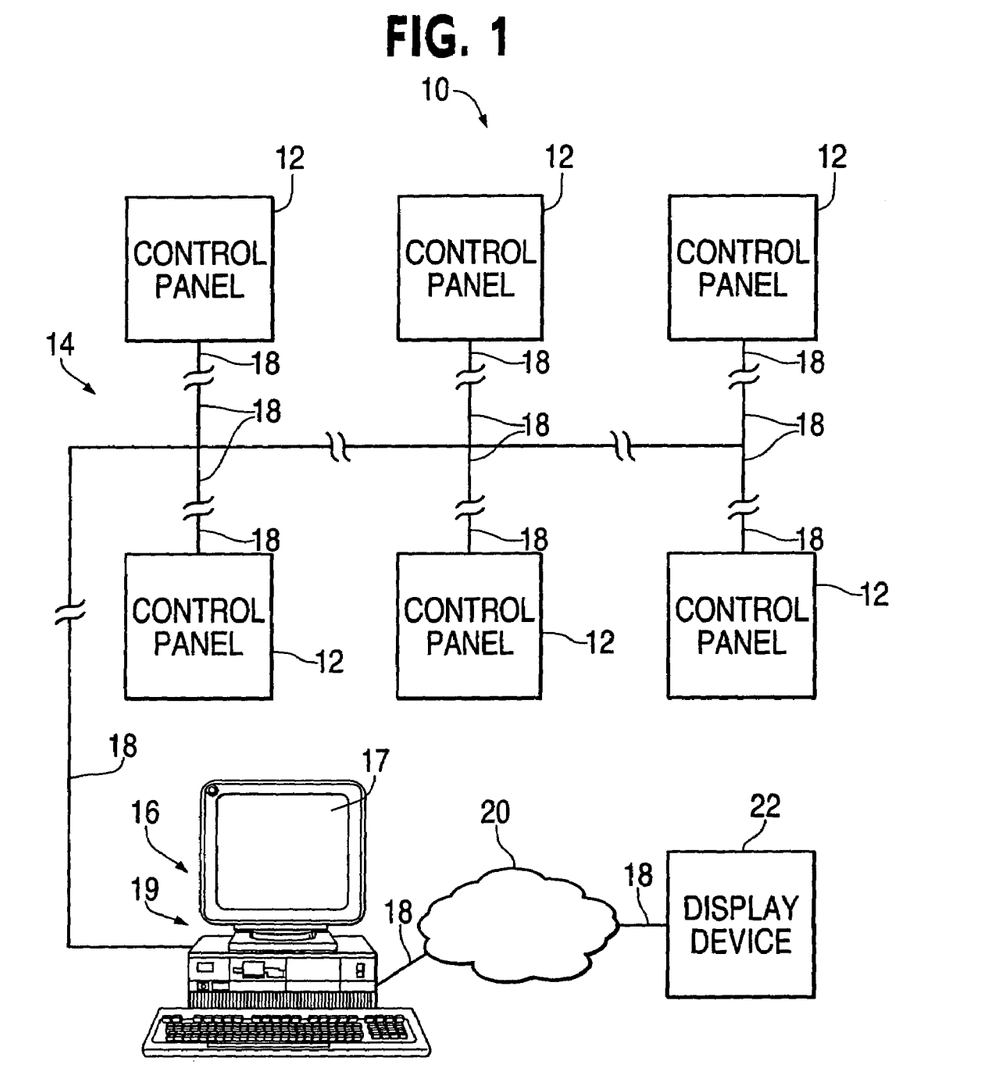
FIG. 1 is a schematic diagram illustrating a loading dock monitoring system according to a preferred embodiment of the invention where the control panels are placed in a network-type configuration.
Figure 5:
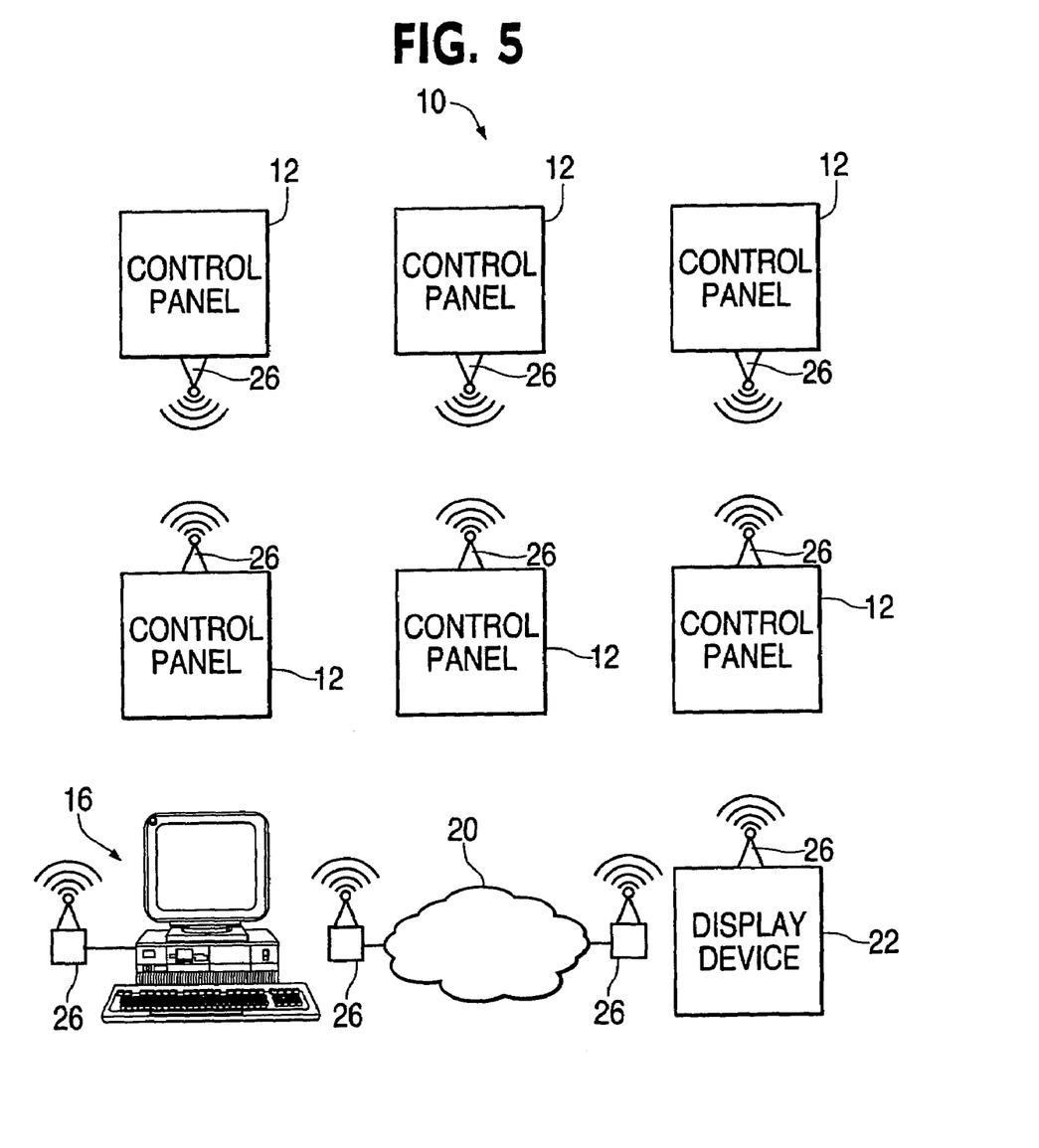
FIG. 5 is a schematic diagram illustrating a dock monitoring system according to another embodiment of the invention where wireless communication is used between various components of the dock monitoring system.

An embodiment of the present inventive apparatus is illustrated in FIG. 1. FIG. 1 is a schematic diagram of a loading dock monitoring system 10 according to a preferred embodiment of the invention. Several control panels 12 used to control various pieces of loading dock equipment are connected in a network-type configuration 14. The control panels 12 are connected via connectors 18 which in some embodiments may be wire connections or in other embodiments of the invention may be wireless connections as shown in FIG. 5. In some embodiments of the invention, the connectors 18 may be RS-485 connectors.

The control panel 12 is connected to an input/output device 16 such as a personal computer or a micro-controller or other type of computer or other device capable of monitoring the control panels 12. The input/output device or computer 16 may include a display device 17 such as a screen 17 or other suitable device capable of displaying equipment status associated with the control panel 12.

According to some embodiments of the present invention, the input/output device 16 communicates to a system user all or some equipment status information associated with the single control panel 12 or with multiple control panels 12. According to some embodiments of the present invention, a specific control panel 12 may be given an individual address such as a number or other identifier. A user may optionally select to view dock loading equipment status for the selected control panel by using the individual address or identifier to be displayed on the display device 17 associated with the input/output device 16.

According to some embodiments of the present invention, various individual pieces of equipment associated with the control panel 12 may be selected and the status of the particular piece of equipment selected for a selected control panel 12 will be displayed.

According to some embodiments of the present invention, a database 19 will be operatively connected with the input/output device 16 and configured to store historical data comprised of loading dock equipment status. The data in the database 19 may, in some embodiments of the invention associate the status of a particular piece of equipment with a particular control panel at a particular time. In other embodiments of the present invention, the database may be configured by the user and adapted to store data associated with control panels and/or individual pieces of equipment and time deemed appropriate by the user.

According to some embodiments of the present invention, and as illustrated in FIG. 1, the input/output device 16 is operatively connected to a network 20. The network 20 may be the Internet, an intranet, a wireless area network (WAN) system, a local area network (LAN), a telephone system or any other suitable type network useful for transporting, communicating or conveying data. According to some embodiments of the invention the network 20 may operate a software program such as SAP, AS-900, or other suitable programs. The network 20 is accessible by a second remote input output device 22 (also referred to as a display device, because it displays or communicates loading back information to a system user). The display device 22 may be another computer, portable or laptop computer, a personal data assistant (PDA), a telephone, a cellular telephone or any other suitable type of piece of equipment capable of accessing a network and displaying or conveying data to a user.

According to the preferred embodiment of the present invention, a user of the remote input/output device 22 accesses the network 20 which, in turn, accesses the input/output device 16. The user selects to view loading dock equipment status information. The loading dock equipment status information may be either the present loading dock equipment status associated with the control panel 12, or it may be historical loading dock equipment status information.

According to a preferred embodiment of the present invention, the loading dock equipment status information may include whether a dock door is open or closed, or traveling toward the open or closed position, or if the dock door is locked. The loading dock equipment status information may also include whether or not a vehicle restraint is engaging a vehicle. It may also include information on whether a dock leveler ramp is in the up or down position or in a neutral level coplanar with the surrounding loading dock position. It may also include dock leveler lip information, such as for example, whether the lip is extended in the pendant position or in an between position. The loading dock status information may also include fault information. For example, the loading dock status information may include whether a particular piece of loading dock equipment is operating properly. The loading dock status information may also include information such as whether a piece of loading dock equipment has been tampered with. For example, whether or not a loading dock door has been attempted to be opened or has been breached from the outside. Other types of loading dock equipment status information may include how long a bay within the loading dock is occupied. The above mentioned examples of loading dock equipment status information is meant to be examples only and in no way limiting. Other types of information are within the scope of the present invention.

According to some embodiments of the present invention, certain types of loading dock equipment status may send an alert to the input/output device 16 which may, in turn, forward the alert to a display device 22. For example, if a loading dock door is tampered with and is opened or is attempted to be opened at an inappropriate time, an alert may be sent to the display device 22 that a break-in is being attempted at a particular loading dock. Other types of equipment status may also cause emergency signals to be sent to the input/output device 16 or the display device 22, or both when predetermined conditions of alarm exist. Examples of alarm conditions may include whether a security alarm has been activated, or a fire alarm has been activated. The security or fire alarm systems may be connected to the input output device 16 directly or via other elements such as the control panel 12.

Figure 2:
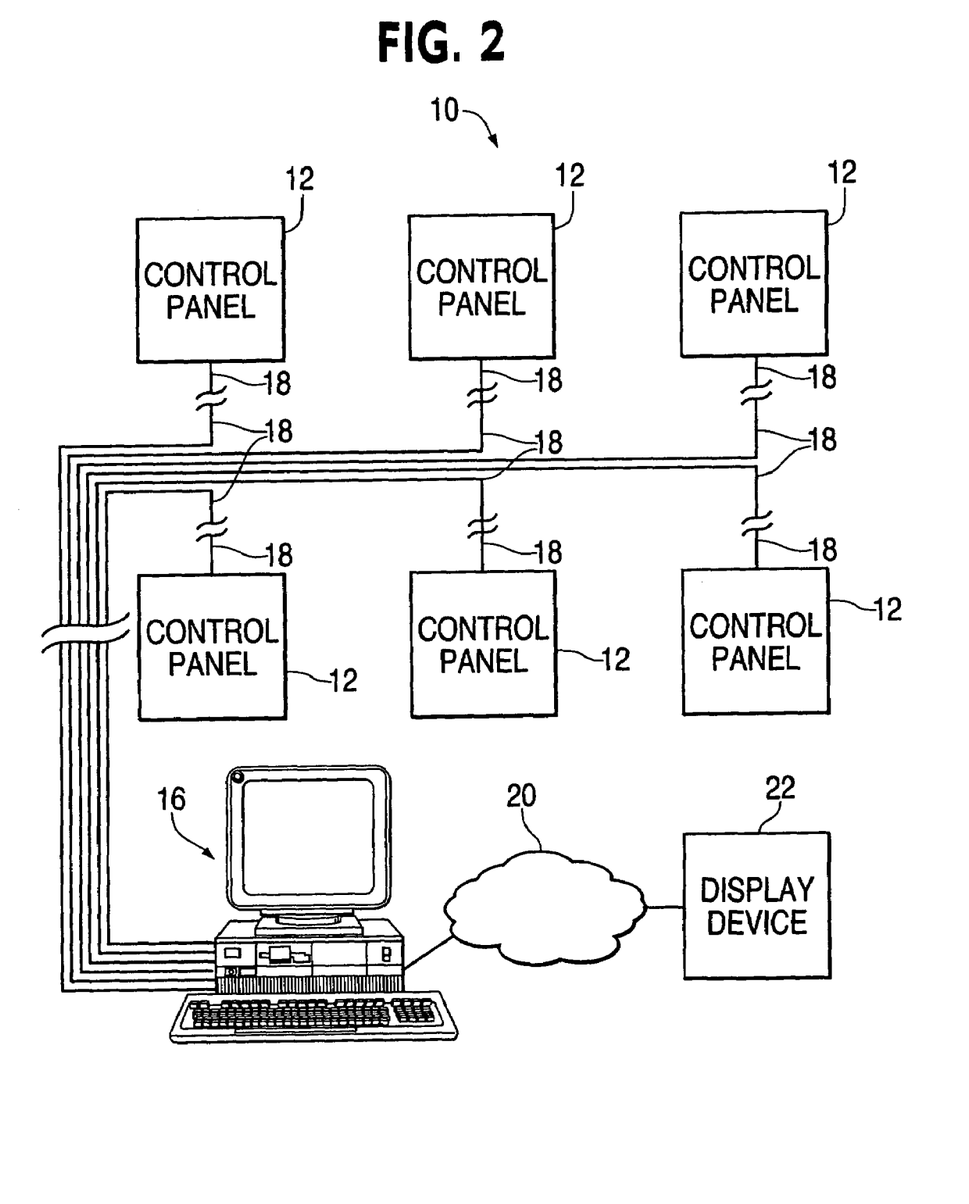
FIG. 2 is a schematic diagram illustrating a loading dock monitoring system according to another embodiment of the invention where the control panels are individually wired to an input/output device.

FIG. 2 is a schematic diagram of an alternate embodiment of the present invention where each control panel 12 is connected by connectors 18 to the input/output device 16, which is, operatively connected to a display device 22.

Figure 3:
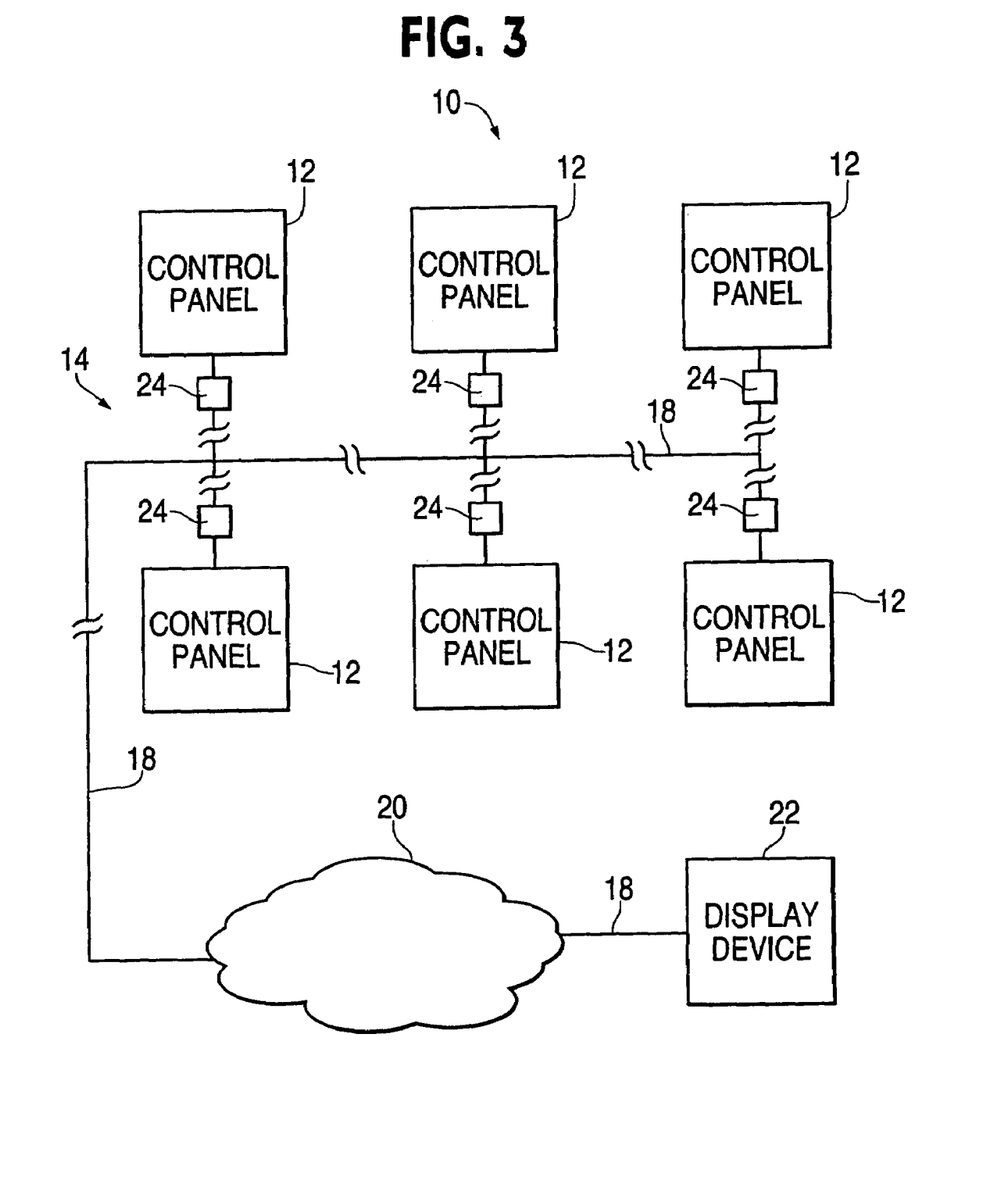
FIG. 3 is a schematic diagram illustrating a dock monitoring system according to another embodiment of the invention where each control panel has an input/output device associated with it.

FIG. 3 is an alternate embodiment of a dock monitoring system 10 according to another embodiment of the present invention. Each control panel 12 has a input/output device 24 associated with it. The control panels 12 and input/output devices 24 are configured in a network 14 type configuration and are connected by connectors 18 to a network 20 which is operatively connected to a display device 22.

Figure 4:
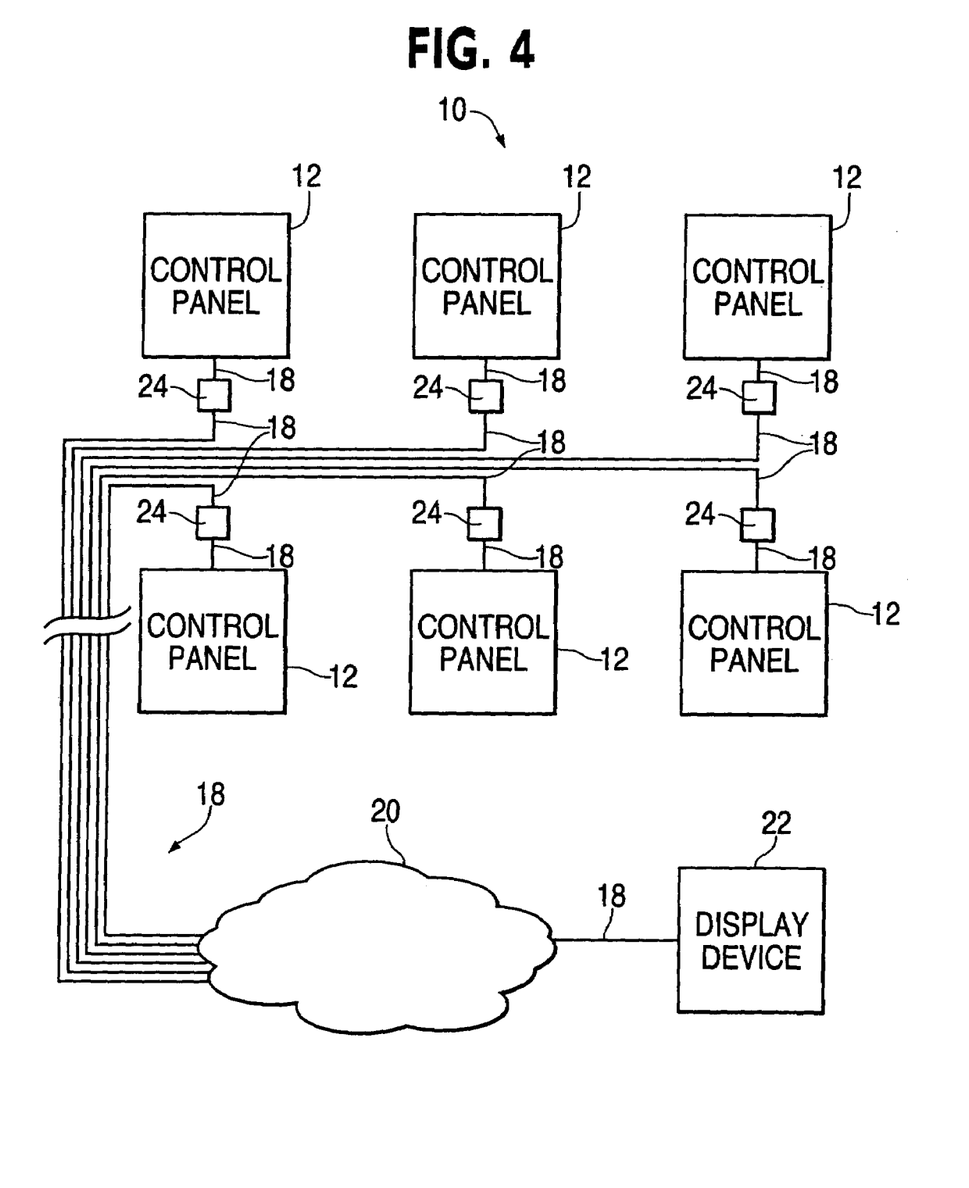
FIG. 4 is a schematic diagram illustrating a dock monitoring system according to another embodiment of the invention where each control panel has an input/output device associated with it, and that input/output device is individually connected to a network.

FIG. 4 is a schematic diagram of yet another embodiment of the present invention where the system 10 includes the control panels 12 having individual input/output devices 24 associated with the control panel 12, and each control panel 12 and input/output device 24 is individually operatively connected by connectors 18 to a network 20 which is accessible and operatively connected to a display device 22.

FIG. 5 is another embodiment of the present invention and is a variation of the embodiment shown in FIG. 1. The embodiment shown in FIG. 5 varies from the embodiment shown in FIG. 1 in that the operative connections are made by wireless connections 16. Examples of wireless connections in accordance with the invention include radio transmissions, short wave, microwave, infra red or any other suitable wireless-type connection. Any of the embodiments shown, or other embodiments in accordance with the present invention, may be modified to include some wireless connections, all wireless connections or no wireless-type connections.

Figure 6:
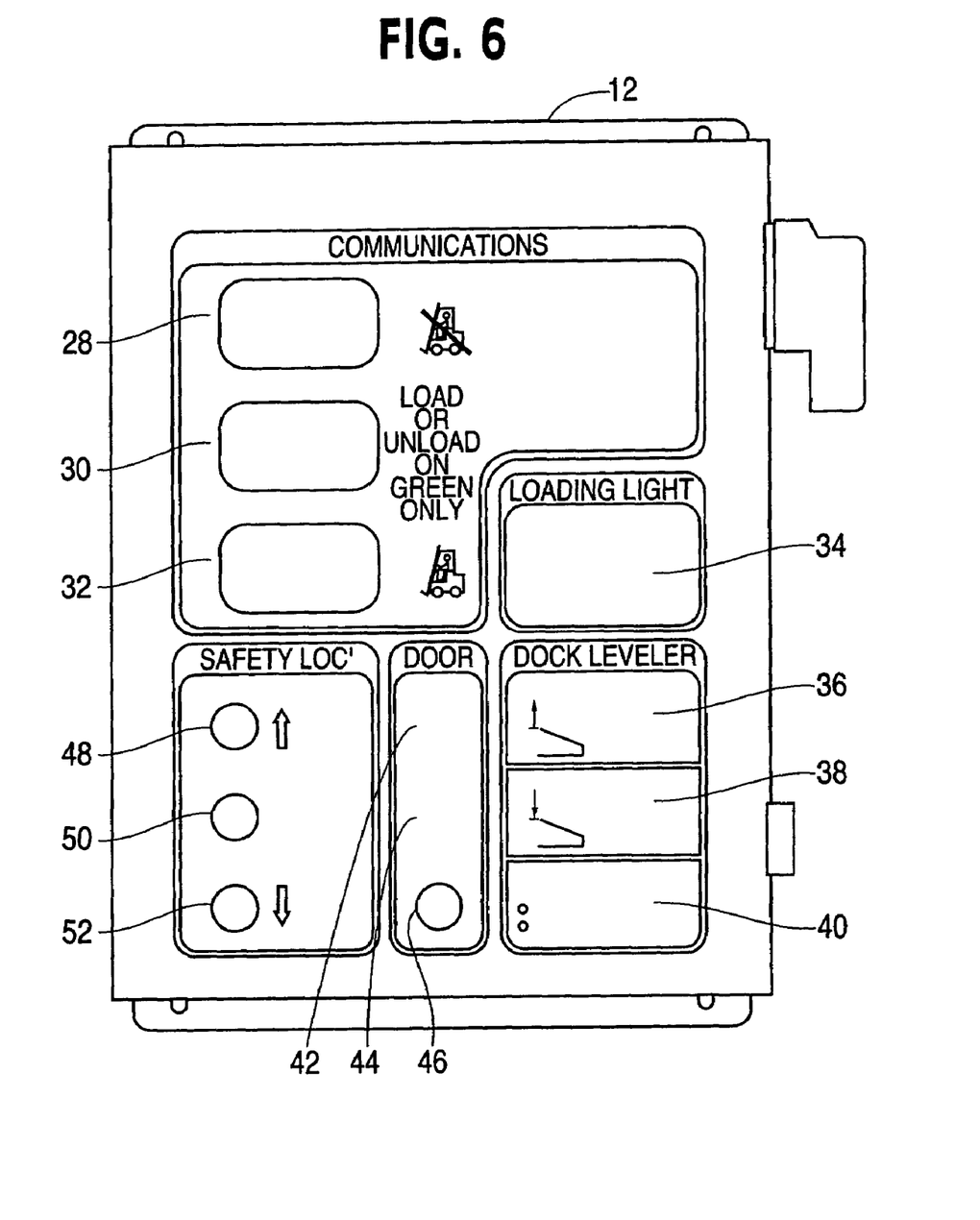
FIG. 6 is a front view of an exemplary control panel according to an embodiment of the invention.

FIG. 6. is a front view a control panel 12 in accordance with a preferred embodiment of the present invention. Control panel 12 has several actuators for controlling individual pieces of loading dock equipment. For example, a loading light switch 34 is located on the control panel 12 for switching on and off the loading light. The control panel 12 also includes a button for raising the dock leveler 36, a button for extending the lip on the dock leveler 38 and a stop button 40 for stopping action of a dock leveler. The stop button 40 causes the dock leveler to stop when pressed and allows the dock leveler to resume operation when the stop button 40 is pulled out.

The control panel 12 also controls a door associated with a loading dock and has an actuator 42 for opening the door, an actuator 44 for stopping the door's movement and an actuator 46 for closing the door.

The control panel 12 also operates a vehicle restraint and has an actuator 48 for engaging the restraint, an actuator 50 for bypassing the restraint, and an actuator 52 for releasing the restraint 52.

Also located on the control panel 12 is a red light 28, an amber light 30 and a green light 32. The red light 28, amber light 30 and green light 32 are useful in assisting dock workers in knowing when to load or unload a vehicle associated with the loading dock. For example, the illumination of the green light 32 may indicate to the dock workers to load or unload a vehicle and the illumination of the red light 28, indicate to a dock worker to not load or unload a particular vehicle.

The control panel shown in FIG. 6 is meant to be exemplary only and not limiting the invention to either the control panel 12 as shown or the loading dock equipment actuated by the actuators located on the control panel 12. Although an example of the device as shown, associated with loading dock equipment, it will be appreciated that other types of equipment can be used, and the system 10 can be modified to be used with a variety of different types of equipment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A loading dock equipment monitoring system comprising:
    a loading dock equipment control panel;
    a first input output device operatively connected to the control panel and configured to be inputted with loading dock equipment status information; and
    a second input output device located remotely from the control panel and first input output device, the second input out put device display operatively connected to the first input output device via a network and configured to communicate to a system user at least some of the loading dock equipment status information.

2. The system of claim 1, further comprising: a plurality of loading dock equipment control panels operatively connected the first input output device and configured communicate to a system user at least some of the loading dock equipment status information associated with at least some of the plurality of loading dock equipment control panels.

3. The system of claim 1, wherein at least part of the loading dock equipment status information associated with a specific loading dock panel is communicated to a system user.

4. The system of claim 1, further comprising a database operatively connected to the system and configured to store loading dock equipment status information.

5. The system of claim 2, wherein the database is operatively connected to the first input output device.

6. The system of claim 1, wherein the loading dock equipment status information includes at least one of: a dock leveler ramp status, a dock leveler lip status, a door status, a vehicle restraint status, and a door lock status.

7. The system of claim 1, wherein the loading dock equipment status information includes at least one of: a fault condition, alarm status, and an emergency condition.

8. The system of claim 1, wherein the network is at least one of an internet, an intranet, a WAN system, and LAN system, and a telephone system.

9. The system of claim 8, wherein the second input output device is at least one of PDA, a personal computer, telephone, and a pager.

10. The system of claim 1, wherein the second input output device is configured to emit an alarm signal when the control panel indicates at least one of a fault condition and an emergency condition.

11. The system of claim 1, further comprising a plurality of control panels and a plurality of first input output devices operatively connected to at least one second input output device.

12. The system of claim 1, wherein at least one of the first and second input output devices is configured to receive input from the system user and send a control signal to the control panel to operate a piece of equipment controlled by the control panel.

13. The system of claim 12, wherein the control signal causes a dock door to at least one of shut, remain shut, and lock in the shut position.

14. The system of claim 1, wherein at least one of the first and second input output devices is configured to emit an alarm signal when the control panel indicates at least one of a fault condition and an emergency condition.

15. A loading dock equipment monitoring system comprising:
   means for controlling loading dock equipment;
   means for inputting and outputting loading dock equipment status information operatively connected to the controlling means and to a network; and
   means for accessing at least some of the loading dock equipment status information via the network.

16. The system of claim 15, further comprising means for storing at least some of the loading dock equipment status information operatively connected to the system.

17. A method of monitoring loading dock equipment status comprising:
   operablely connecting a loading dock equipment control panel to a first input output device;
   configuring the control panel to input loading dock status information into the first input output device;
   operablely connecting a second input output device via a network to the first input output device; and
   configuring the second input output device to communicate loading dock equipment status information to a system user.

18. The method of claim 17, further comprising operatively connecting a data storage device to the system and configuring the data storage device to store loading dock equipment status information.

19. The method of claim 18, further comprising operatively connecting the second input output device to the data storage device and permitting a system user to access current and stored loading dock equipment status information with second input output device via the network.

20. The method of claim 17, further comprising configuring the system to send an alarm signal to the second input output device via the network when the loading dock status information is in a predetermined condition of alarm.

* * * * *